United States Patent [19]

Schmidt et al.

[11] Patent Number: 4,940,120
[45] Date of Patent: Jul. 10, 1990

[54] DISC BRAKE, ESPECIALLY FOR USE WITH AUTOMOTIVE VEHICLES

[75] Inventors: Bodo Schmidt, Lauterbach; Helmut Krause, Kelkheim

[73] Assignee: Alfred Teves GmbH, Frankfurt, Fed. Rep. of Germany

[21] Appl. No.: 371,684

[22] Filed: Jun. 23, 1989

Related U.S. Application Data

[63] Continuation of Ser. No. 169,529, Mar. 17, 1988, abandoned.

[30] Foreign Application Priority Data

Mar. 21, 1987 [DE] Fed. Rep. of Germany ....... 3709396

[51] Int. Cl.$^5$ ............................................. F16D 65/02
[52] U.S. Cl. ................................ 188/73.36; 188/1.11; 188/73.38
[58] Field of Search ............... 188/73.35, 73.36, 73.37, 188/73.38, 205, 206, 71.1, 250 A, 250 E, 250 R, 1.11

[56] References Cited

U.S. PATENT DOCUMENTS

| | | | |
|---|---|---|---|
| 4,061,209 | 12/1977 | Gee et al. | 188/73.36 |
| 4,360,081 | 11/1982 | Ito et al. | 188/73.38 |
| 4,392,561 | 7/1983 | Watanabe | 188/73.36 |
| 4,428,463 | 1/1984 | Burgdorf et al. | 188/73.38 |
| 4,441,588 | 4/1984 | Saito | 188/73.38 |
| 4,527,667 | 7/1985 | Courbot | 188/73.38 X |
| 4,537,291 | 8/1985 | Thiel et al. | 188/1.11 X |
| 4,538,708 | 9/1985 | Seki | 188/73.38 |
| 4,596,317 | 6/1986 | Nagai et al. | 188/73.38 X |
| 4,658,938 | 4/1987 | Thiel et al. | 188/73.38 |
| 4,673,065 | 6/1987 | Gerard et al. | 188/73.38 |
| 4,784,242 | 11/1988 | Thioux | 188/73.38 X |

FOREIGN PATENT DOCUMENTS

| | | | |
|---|---|---|---|
| 0059128 | 9/1982 | European Pat. Off. | |
| 0172064 | 2/1986 | European Pat. Off. | |
| 0202993 | 11/1986 | European Pat. Off. | |
| 0203841 | 12/1986 | European Pat. Off. | |
| 2345733 | 3/1975 | Fed. Rep. of Germany | |
| 2514383 | 11/1975 | Fed. Rep. of Germany | |
| 3220632 | 12/1983 | Fed. Rep. of Germany | |
| 3227195 | 1/1984 | Fed. Rep. of Germany | |
| 3533931 | 3/1987 | Fed. Rep. of Germany | 188/73.38 |
| 0109837 | 8/1980 | Japan | 188/73.38 |
| 0112430 | 8/1980 | Japan | 188/73.36 |
| 0163735 | 10/1982 | Japan | 188/73.37 |
| 1591735 | 6/1981 | United Kingdom | |
| 2111616 | 7/1983 | United Kingdom | 188/73.38 |
| 2199909 | 7/1988 | United Kingdom | 188/73.38 |

Primary Examiner—Douglas C. Butler
Attorney, Agent, or Firm—Robert P. Seitter

[57] ABSTRACT

A disc brake, especially for use with automotive vehicles is disclosed including brake housing staddling the rim of a brake disc, brake pads disposed on either side of the brake disc and a spring supported on the brake housing and on the brake pads to load the same with respect to one another. To attain an adequate preloading force and to insure the required stroke, it is provided that the spring includes two circumferentially extending U-shaped spring arms that are capable of being placed into abutment with a supporting face on the brake pad. Another section of the spring abuts on a supporting face formed on the brake housing. The spring arms form an obtuse angle relative to a central section of the spring.

3 Claims, 4 Drawing Sheets

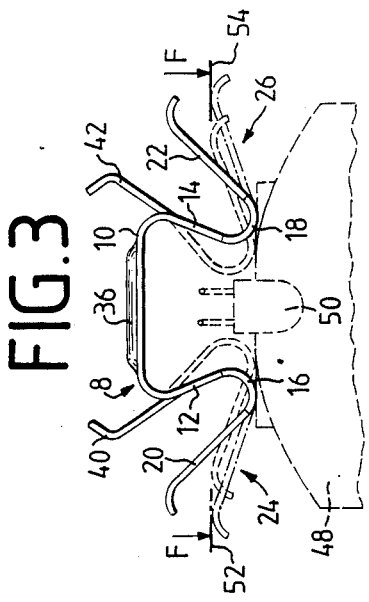
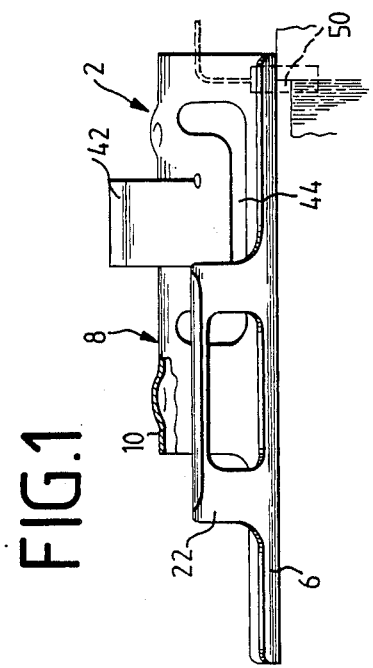
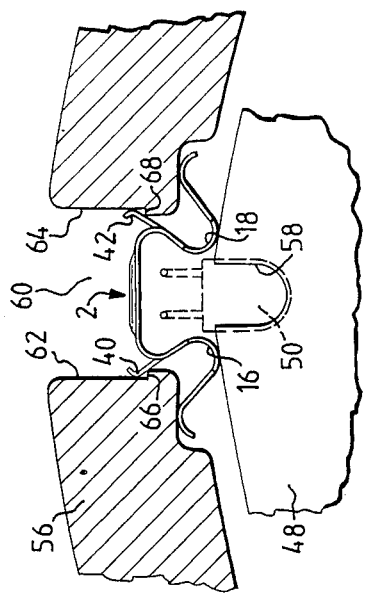
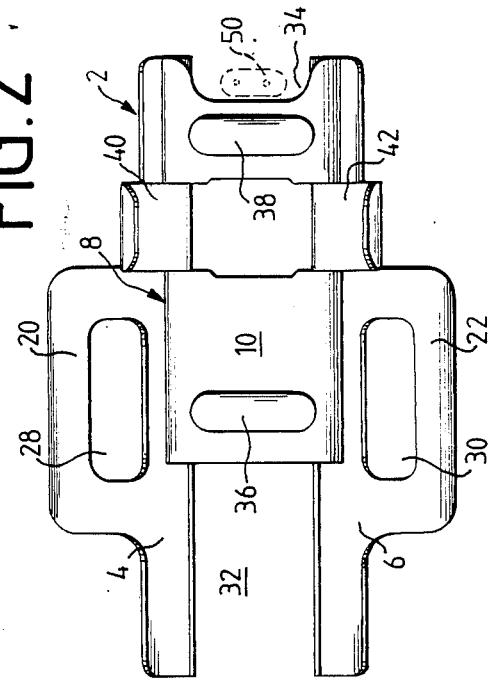

DISC BRAKE, ESPECIALLY FOR USE WITH AUTOMOTIVE VEHICLES

This application is a continuation of application Ser. No. 169,529, filed Mar. 17, 1988, now abandoned.

BACKGROUND OF THE INVENTION

The present invention relates to a disc brake, especially for use with automotive vehicles.

In disc brakes of this type, so-called "central springs" are employed to load the housing and the pads with respect to one another and against a holder. This preload precludes undesirable relative movement of the brake components otherwise likely to cause rattling noises or lift-off. A spring of this type is described in the German patent application P 35 33 931 published Mar. 26, 1987.

The German patent application DE-32 20 632.1, published Dec. 8, 1983, discloses an arrangement wherein the brake pads, on an upper side thereof, are provided with wire-springs supported, on the one hand, on the back plate of the wire-spring and, on the other hand, on the brake housing. These wire-springs are helically wound and inserted into U-shaped grooves in the back plates and include legs in abutment with a bottom side of the brake housing, thereby loading the pads against the brake carrier and against the brake housing. A similar spring disclosed in the German patent application DE-P 32 27 195.6, published Jan. 26, 1984, is made of sheet metal and is fixed to a pin of the pad back plate.

Great Britain patent GB-PS 15 91 735 discloses a disc brake provided with a cross-shaped leaf-spring comprising two circumferentially extending legs straddling pad holding pins rigidly secured to the brake housing, and two axially extending legs in abutment with the back plates of the brake pads to force apart the brake pads after actuation. However, the use of cross-shaped springs of this type requires the brake pads to be held in the brake housing by means of pad holding pins. These and other known solutions exhibit the disadvantage that, depending on the operational and mounting space conditions, respectively, either it is impossible to apply an adequate preload force or obtaining the required stroke is precluded due principally to excessive rise in the spring forces or the occurrence of plastic deformation.

SUMMARY OF THE INVENTION

It is, therefore, the object of the invention to provide for a disc brake arrangement of a type which allows an adequate preloading force to be applied as well as providing for the required stroke to be achieved.

According to the invention, there is provided a spring comprising two circumferentially extending spring arms bent in substantially U-shaped manner capable of being placed into abutment with a supporting face on the brake pad and another section of the spring supported on a supporting face formed on a brake housing.

The invention provides for a disc brake comprising an easily mountable central spring by way of which loading of the brake housing the brake pads and the holder, respectively, is achieved, with an adequate preloading force without plastic deformation of the spring. According to an advantageous embodiment of the invention, the spring comprises a central section of a substantially U-shaped configuration extending from which are the spring arms. Due to the configuration of the central spring according to the invention, brake lining wear warning means and contacts, respectively, may be located without involving any space problems. The electrical conductors of these warning means can be readily guided axially and/or radially out of the area of the U-shaped central section. To prevent the spring from dropping out when replacing the brake pads there is provided, according to another advantageous embodiment, that the spring includes two additional spring arms capable of being placed into abutment with other abutment faces on the brake housing. For this purpose, a step is provided in the area of a passageway provided in the brake housing. The additional spring arms preferably are located in the area of the central section and are connected thereto, respectively.

The additional spring arms are provided with bent over end sections which abut the abutment faces on the brake housing.

Advantageously, the additional spring arms extend in a direction substantially opposite the side portions of the central section of the spring.

According to another advantageous embodiment, the spring comprises two circumferentially spaced-apart sections extending substantially in parallel to the brake disc axis, which protrude, in the axial direction, beyond the spring arms and can be placed into abutment with abutment faces on the brake pad. These sections which extend in parallel to the brake disc axis, form, on one side, a central recess extending down to the area of the spring arms.

Advantageously, a number of recesses are provided in the area of the spring arms.

According to a preferred embodiment of the invention, the central section of the spring extends axially, on one side, down to the abutment area of the brake pad and in that area comprises a number of recesses through which the connecting wires of a friction lining-warning contact may be guided.

According to another advantageous embodiment, the central section comprises at least one circumferentially extending recess or depression.

Also, it is possible to provide recesses for guiding therethrough warning contact connections in the central area of the central section of the spring.

To insure a resetting effect on the friction linings, the axially extending sections of the spring can be formed at an angle with respect to one another.

BRIEF DESCRIPTION OF THE DRAWING

A preferred embodiment of the invention and advantageous configurations thereof are illustrated in the drawings wherein:

FIG. 1 is a side view of a preferred embodiment of a spring according to the invention;

FIG. 2 is a plan view of the spring shown in FIG. 1;

FIG. 3 is a front view of the spring shown in FIGS. 1 and 2, showing a brake pad having a friction lining-warning contact and the mounting position of the spring;

FIG. 4 is a partial cross sectional view showing the spring mounted to a brake pad and a brake housing;

DETAILED DESCRIPTION OF A PREFERRED EMBODIMENT

Figure 5:
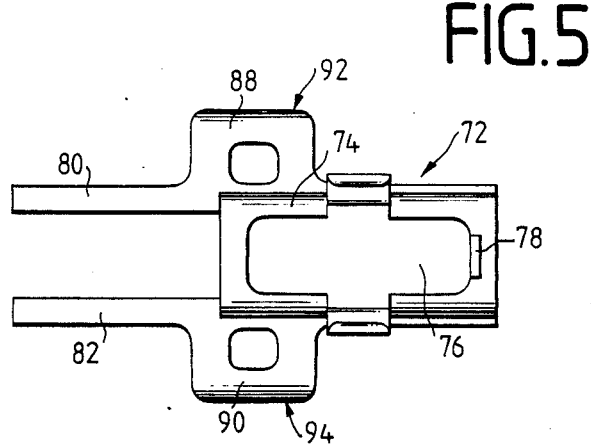
FIG. 5 is a plan view of an alternative embodiment of a spring according to the invention.

Referring to a preferred embodiment of a spring 2 as shown in FIGS. 1, 2, 3 and 4, the spring 2 comprises two elongated sections 4, 6 extending in parallel and, in their mounted condition, extend parallel to the brake disc axis. The two parallel sections 4, 6 are interconnected through a central section 8 which, in cross-section as shown in FIG. 4, is of a substantially U-shaped configuration. The central section 8 comprises a substantially rectangular upper section 10 and two side portions 12, 14. The side portions, relative to the central axis of the central section are of substantially U-shaped configuration and extend at an acute angle toward the central axis. U-shaped bends 16, 18 join to side portions 12, 14 and terminate in freely bent end sections 20, 22. The side portions 12, 14, the bends 16, 18 and the end sections 20, 22 thus form spring arms 24, 26 extending in the circumferential direction. As shown in FIG. 2, the end sections 20, 22 of the spring arms in the central area of the spring are of a substantially rectangular shape and include rectangular passageways 28, 30.

Sections 4 and 6, on the side, which in the drawing is the left-hand side, protrudes beyond the central section 8 such that a free space 32 is formed therebetween. On the other side, the central section 8 is guided substantially down to the end area of sections 4, 6 to form therein a recess 34 capable of guiding therethrough the connecting wires of a friction lining-warning device. Provided in the end areas of the central section 8 are elongated recesses or depressions 36, 38 that extend in the circumferential direction.

Starting from the central section 8, two additional spring arms 40, 42 are provided that extend substantially opposite the side portions 12, 14. The ends of the spring arms 40,42 are bent toward the center line and extend radially beyond the upper part 10 of the central section 8. The spring arms 40, 42 are configured to extend axially substantially adjacent the end sections 20, 22. As shown in FIG. 1, the side portions 12, 14 comprise U-shaped passageways 44. FIG. 3 shows the spring 2 in solid lines in an unloaded condition, and in dashed or dash-dotted lines in a mounted condition. The upper part of a friction lining 48 and a warning contact 50 are also shown in dashed lines. As shown in FIG. 3, the spring 2, with the bends 16, 18, is supported on the upper side of the friction lining 48 and on the back plate thereof, respectively. The end sections 20, 22 are in abutting relationship with first abutment faces 52, 54 provided on the brake housing only a portion of which is shown in FIG. 4 and extend substantially horizontally and peripherally, respectively. The supporting faces are designated by reference character F in FIG. 3. FIG. 3 shows a spring 2 in the mounted condition, with a brake housing 56 and the friction lining 48 being depicted.

The friction lining 48 comprises U-shaped recess 58 capable of receiving the warning contact 50. The brake housing 56 is provided with a passageway 60 forming vertically and radially extending side walls 62, 64, respectively, defining second abutment faces with which the bent end portions of the spring arms 40, 42 are in abutment. The side walls 62, 64 comprise shoulders 66, 68 straddled by the end sections of the spring arms 40, 42, thereby precluding a slip-through of the spring in the downward direction as viewed in FIG. 4. The end portions of the spring arms 40, 42, instead of being bent toward the center line, may also be bent away therefrom with the end faces thereof supported on shoulders 66, 68.

Figure 6:
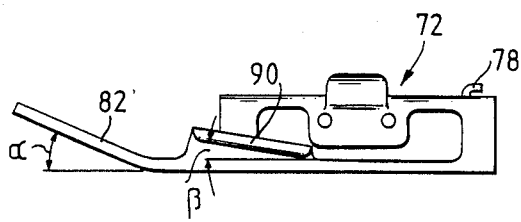
FIG. 6 is a side view of the spring shown in FIG. 5.
Figure 7:
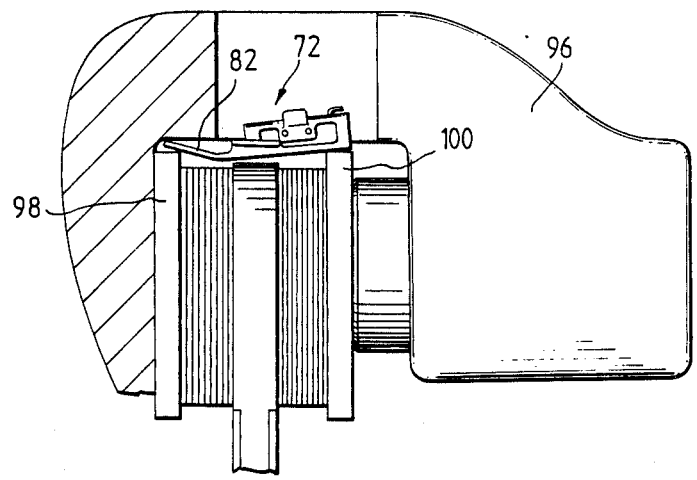
FIG. 7 is a partial cross sectional view through a disc brake showing the spring according to FIGS. 5 and 6 mounted.

Now, referring to the embodiment of a spring 72 as shown in FIGS. 5, 6 and 7 the features of the spring 72 correspond to those of spring 2. However, unlike the spring 2, spring 72 comprises a central passageway 76 in a central section 74, which serves to guide therethrough parts of a warning contact. At the end of the passageway 76, a flap 78 is provided to protect the conductors of the warning contact. As shown in FIGS. 6 and 7, sections 80, 82 of the spring 72 extend in parallel and are bent at an angle thereby providing a resetting effect on the brake pads. The tip of the angle is provided adjacent the area of the spring arms 92, 94.

The end sections 88, 90 of the spring arms 92, 94 extend at a small angle relative to the the sections 80, 82. FIG. 2 shows the spring 72 mounted into a brake housing 96. The ends of the sections 80, 82 are seated on the back plates 98, 100 of the brake pads. The end sections 88, 90 of the spring arms extend approximately in parallel to the brake disc axis while sections 80, 82 extend at a small angle thereto thereby causing the afore-mentioned resetting effect.

Figure 8:
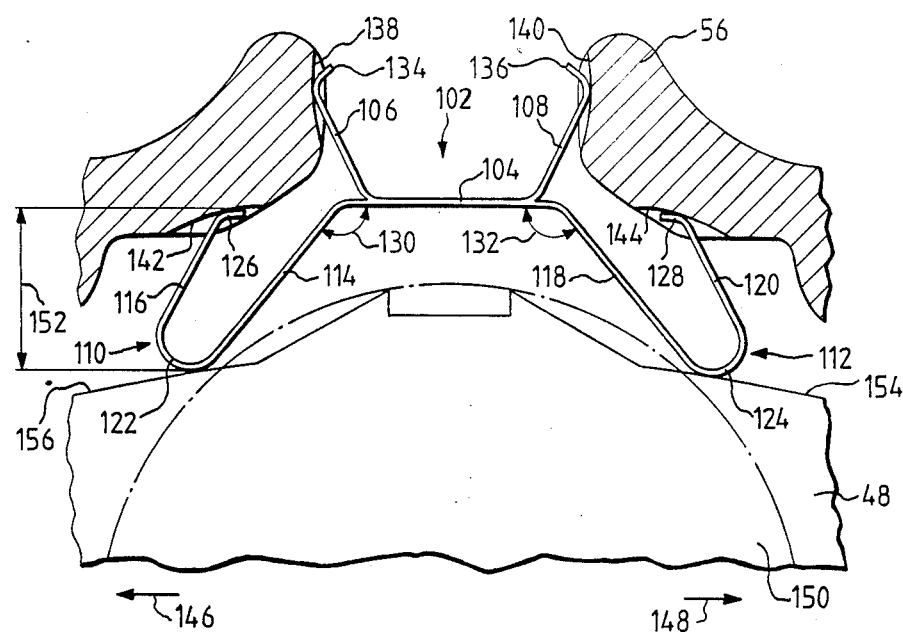
FIG. 8 is a partial cross sectional view showing details of an expansion spring.

FIG. 8 shows an expansion spring 102 comprising a central section 104, two laterally supported upwardly directed spring arms 106 and 108 and two downwardly directed U-shaped spring arms 110 and 112 adjoining the central section 104. Each of the two spring arms 110 and 112, respectively, comprises two legs 114 and 116 and 118 and 120, respectively, a bottom portion 122 and 124, respectively and an end section 126 and 128, respectively.

The end sections 126 and 128 are bent so as to approximately face the central section 104, and are located in a relief 142 and 144, respectively, provided in the brake housing 56. The end sections 126, 128 are bent toward the central plane of the brake housing 56. Each of the two legs 114 and 118, respectively, with the central section 104, forms an obtuse angle 130 and 132, respectively of between 90° and 180°.

Each of the two lateral spring arms 106 and 108, respectively, comprises another bent end section 134 and 136, respectively, which is located in another relief 138 and 140 provided in the brake housing 56. The bottom parts 122 and 124 of the spring arms 110 and 112 are seated on a rim of the friction lining 48—hereinafter referred to as friction lining carrier. The spring arms 110 and 112, on the one hand, are supported on the brake housing 56 and, on the other hand, are supported on the friction lining carrier 48. The legs 114 and 118, toward the central section 104 of the spring 102, at the obtuse angle 130 and 132, are so expanded that upon movement of the caliper housing 56 and the friction lining 48 relative to one another, the spring arms 110 and 112, respectively expand in the directions 146 and 148, respectively. The spring arms 110 and 112, in a preloaded condition, are so expanded at angle 130 and 132, that a piston protecting cap 150—hereinafter referred to as the elastomeric portion—which protects the piston against the ingress of dirt and other contaminations, is movable between and through the spring arms 110 and 112 (i.e. in a direction vertical to the plane of the drawing) in a manner unaffected and uninfluenced by the spring 102.

Figure 9:
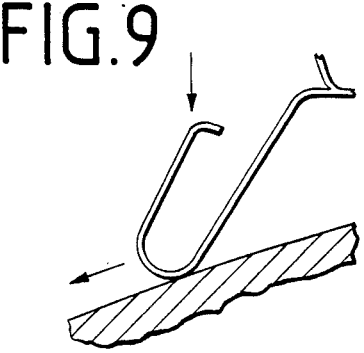
FIG. 9 is a diagram showing operation of the spring with the brake pad angled.
Figure 10:
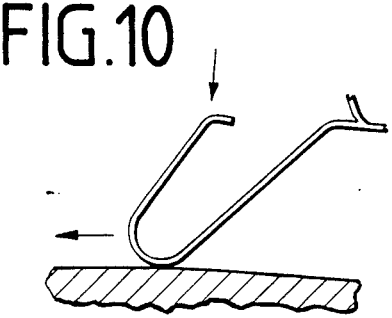
FIG. 10 is a diagram showing operation of the spring with brake pad level.
Figure 11:
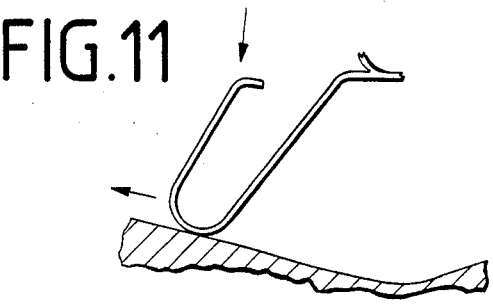
FIG. 11 is a diagram showing operation of the spring with brake pad angled opposite to that in FIG. 9.

Advantageously, the spring 102 is made from spring sheet, such as stainless steel sheet. Due to the arrangement of the spring arms 110 and 112, the spring 102 is inserted within the space 152 radially, which space corresponds to the spacing between the brake housing 56 and the lining carrier 48 and is advantageously minimized. In case of a flatter and/or more elongated mounted space, more extended spring arms 110, 112 will result. The oblique faces 154 and 156 on the lining carrier 48 act in the spring direction and support the spring action, that is, the bottom parts 122 and 124 slip downwardly in the oblique direction. Depending on the desired spring action, as shown in FIG. 9, the spring action is in the same direction as a slant provided to the surfaces 154, 156 while according to FIG. 10, the spring action is in a horizontal plane and as shown in FIG. 11, the spring action is against the slant provided to the surfaces 154, 156.

Figure 12:
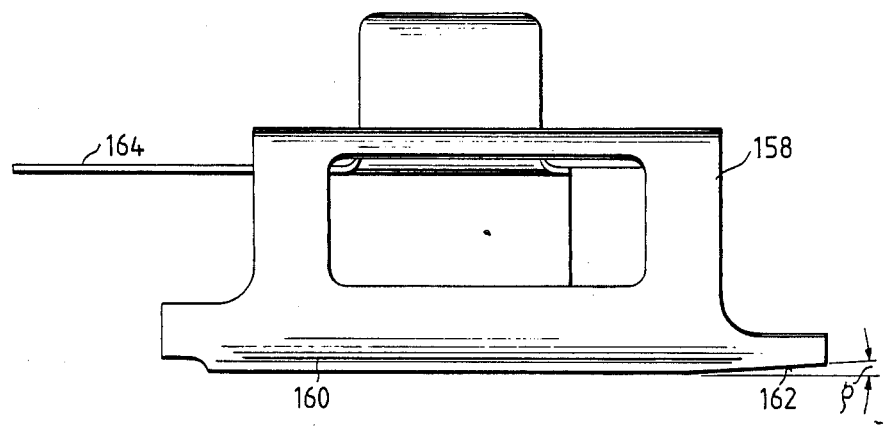
FIG. 12 is a side view of another alternative embodiment of a spring including a slide.

FIG. 12 shows a spring 158, in side view, having a slide 160 and an outrunning slant 162. Advantageously, the slant 162 forces the lining carrier 48 against the brake housing 96. A lug 164 precludes incorrect insertion of the spring 158 into the housing 56, 96.

Figure 13:
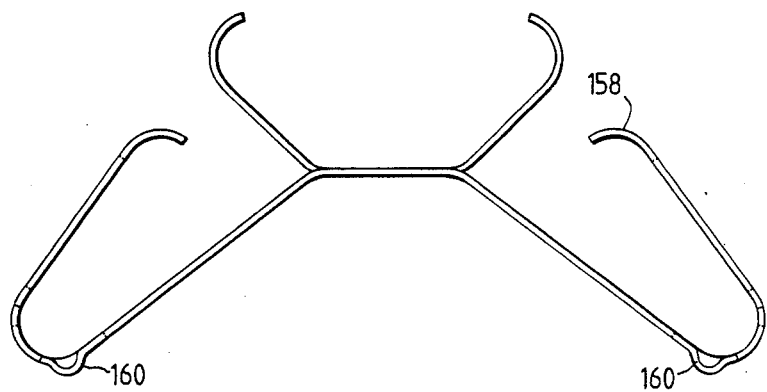
FIG. 13 is another view of the spring including a slide.

FIG. 13 shows a spring 158 having two slides 160.

What is claimed is:

1. A disc brake for use with an automotive vehicle, comprising, in combination: a brake housing saddling the rim of a brake disc, brake pads located on either side of the brake disc, a spring supported on the brake housing and on the brake pads adapted to load the brake housing and the brake pads relative to one another, said spring including two circumferentially extending and spaced apart U-shaped spring arms with the base portion between the leg portions of each of said U-shaped spring arms being adapted to abut on a supporting face on the brake pad, another section of each of said spring arms of said spring adapted to abut on a supporting face formed on the brake housing wherein each of the spring arms forms an obtuse angle relative to a central section between said spring arms of said spring.

2. The disc brake according to claim 1 wherein the spring arms are located in a circumferential direction relative to said brake disc in a manner capable of being expanded.

3. The disc brake according to claim 1 wherein end sections of said spring arms are bent toward a center plane of the brake housing thereby to abut said brake housing.

* * * * *